| United States Patent [19] | [11] Patent Number: 4,992,228 |
| Heck et al. | [45] Date of Patent: Feb. 12, 1991 |

[54] METHOD FOR PREPARING PREFORMS FOR MOLDING PROCESSES

[75] Inventors: Henry G. Heck, Bühl, Fed. Rep. of Germany; Warren D. White, Lake Jackson, Tex.

[73] Assignee: The Dow Chemical Company, Midland, Mich.

[21] Appl. No.: 414,052

[22] Filed: Sep. 28, 1989

[51] Int. Cl.$^5$ .................. B29C 43/20; B29C 41/20
[52] U.S. Cl. .................. 264/135; 264/137; 264/258; 264/324
[58] Field of Search .............. 264/258, 135, 136, 137, 264/324

[56] References Cited

U.S. PATENT DOCUMENTS

| 3,922,418 | 11/1975 | Lauchenauer | 428/196 |
| 4,213,930 | 7/1980 | Goodrich et al. | 264/135 |
| 4,325,770 | 4/1982 | Korpman | 156/230 |
| 4,329,387 | 5/1982 | Goodrich et al. | 428/196 |
| 4,496,415 | 1/1985 | Sprengling | 156/283 |

FOREIGN PATENT DOCUMENTS

| 53-143665 | 12/1978 | Japan . |
| 56-163173 | 12/1981 | Japan . |
| 59-008374 | 2/1984 | Japan . |
| 2158471A | 11/1985 | United Kingdom . |

OTHER PUBLICATIONS

Whittington's Dictionary of Plastics; Lloyd Wittington, first edition, 1968 p. 220.

Primary Examiner—Jay H. Woo
Assistant Examiner—Jeremiah F. Durkin, II

[57] ABSTRACT

Preforms for molding processes such as resin transfer molding processes are prepared by melting a solid, non-sintering, thermoplastic-like resinous compound on the surface of a substrate material; after cooling, assembling one or more plies of the coated substrate material into the desired shape; heating the thus shaped substrate material to a temperature above the melting temperature of resinous compound and subsequently cooling to a temperature below the melting point of the resinous compound.

7 Claims, No Drawings

METHOD FOR PREPARING PREFORMS FOR MOLDING PROCESSES

FIELD OF THE INVENTION

The present invention concerns a method for preparing preforms for molding processes, especially resin transfer molding processes and the preforms so prepared.

BACKGROUND OF THE INVENTION

Various molding processes such as resin transfer molding (RTM) processes involve loading dry reinforcement layers into a mold, closing the mold, injecting a thermosetting resin composition into the mold and curing the resin via the application of heat. One of the bottlenecks in such a process is loading the reinforcement into the mold. The individual layers of fabrics must be cut and shaped to conform to the various curvatures in the mold. This can be very time consuming, especially for layups (preforms) involving foam cores. It would be desirable to assemble the reinforcement outside of the mold and load only that structure (or preform) into the mold at one time.

Two common approaches in assembling the preform are (1) to tie layers together with reinforcement strands or (2) to use a viscous liquid or solid resin as an adhesive to hold the layers together. Either method is unsatisfactory from the standpoint of ease or economy of operation.

Tying the layers together is economically unsound since the labor costs associated with this method are too high. Gluing the layers together with a resin is a better approach but resins systems such as Spray 77 available from 3M Corporation which are currently employed adversely affect the mechanical properties of subsequent molded composites at elevated temperatures in the presence of moisture. The solid resins have been previously applied by solvent techniques which are energy intensive, and affect fiber sizing. The liquid resins have been applied using messy painting techniques and require solvent recovery systems.

It would be desirable to have available a method for assembling preforms for molding processes which did not involve tying, gluing or solvent recovery.

The present invention provides a method for preparing preforms for use in molding processes which avoids the use of tying, gluing or solvent recovery.

SUMMARY OF THE INVENTION

The present invention pertains to a method for preparing preforms which comprises (1) applying substantially evenly onto the surface of each of one or more plys of an unimpregnated substrate material one or more non-sintering thermoplastic-like resinous compounds which are substantially free of any compound which would serve as a crosslinker for said thermoplastic, solid resinous compound, said resinous compound being in the form of a powder having a particle size less than about 500 microns and having a melting point as determined by Differential Scanning Calorimetry of from about 50° C. to about 70° C. in an amount of from about 3 to about 5 percent by weight based upon the weight of said substrate material: (2) fusing said powdered thermoplastic-like resinous compound into a film on the surface of said substrate material: (3) cooling said resinous material; (4) assembling one or more plies of the thus treated substrate material and conforming said plies of said treated substrate material into a desired shape; (5) subjecting the thus shaped plies of treated substrate material at a temperature sufficient to melt said resinous compound; and (6) cooling said shaped treated plies of substrate material to a temperature below the melting point of said resinous compound; thereby forming a preshaped preform for use in molding processes as reinforcing material.

Another aspect of the present invention pertains to the preform prepared by the aforementioned method.

By the term "thermoplastic-like", it is meant that the resinous powder layer on the surface of the substrate can be melted or solidified at will by raising or lowering the temperature of the substrate.

DETAILED DESCRIPTION OF THE INVENTION

Any thermosettable resinous compound which is compatible with the thermosettable composition to be employed in the subsequent molding process in which the preform is to be employed is suitable so long as it also meets the physical requirements. Such physical requirements are that it be non-sintering at ambient temperature, about 30° C.; have a melting point as determined by Differential Scanning Calorimetry of from about 50° C. to about 70° C., preferably between about 55° C. and 65° C., more preferably between about 57° C. and 60° C.; and a particle size less than about 500, preferably between about 20 and about 500, more preferably between about 30 and about 200, most preferably between about 40 and about 80, microns.

The non-sintering, solid, thermoplastic-like resinous compound is employed in an amount of from about 2 to about 12, preferably from about 3 to about 8, more preferably from about 4 to about 6, percent by weight based upon the weight of the substrate material.

Suitable such non-sintering, solid, thermoplastic resinous materials include epoxy resins, vinyl ester resins, unsaturated polyester resins, combinations thereof and the like.

Particularly suitable epoxy resins include, polyglycidyl ethers of polyhydric phenols (compounds having an average of more than one phenolic hydroxyl group per molecule) such as, for example, diglycidyl ethers of biphenol, bisphenols, hydrocarbyl substituted biphenol, hydrocarbyl substituted bisphenols, phenol or hydrocarbyl substituted bisphenol-aldehyde novolac resins, unsaturated hydrocarbon-phenol or hydrocarbyl substituted phenol resins, combinations thereof and the like. Most particularly suitable are the diglycidyl ethers of bisphenol A having a epoxide equivalent weight of from about 650 to about 750.

Particularly suitable vinyl ester resins include, for example, the acrylates or methacrylates of polyglycidyl ethers of compounds having an average of more than one phenolic hydroxyl group per molecule. Most particularly suitable are the reaction products of the diglycidyl ether of bisphenol A and acrylic or methacrylic acid said reaction product having a number average molecular weight of from about 800 to about 1400.

Particularly suitable unsaturated polyester resins include, for example, the reaction products of fumaric acid, and propoxylated or ethoxylated bisphenol A.

Suitable substrate materials include, for example, glass, aramid, graphite or carbon, nylon, rayon, polyester, suitable substrate materials are E-glass, S-glass, graphite or carbon, combinations thereof and the like.

The substrate material can be in the form of woven or non-woven fibrous material, random fibers, monofilaments, multi-strands of monofilaments stitched together in various combinations of weave, and the like. Preferably, the substrate material is in the form of woven or non-woven fibrous material.

It is important that the non-sintering, thermoplastic-like resinous powder be applied in a substantially even manner over the surface of the substrate materials. By the term "substantially even manner" it is meant that the resinous powder layer on the surface of the substrate material has been applied such that the average depth of resinous powder, after melting, is from about 5 microns to about 80, preferably from about 15 to about 50, more preferably from about 25 to about 35, microns.

The non-sintering, thermoplastic-like resinous powder can be applied by hand, by flour sifter-type apparatus, by electrostatic spraying, or the like.

One method of applying the resinous powder is by hand. The powder is sprinkled onto the reinforcement layer and smoothed over the surface until it covers it in a substantially even manner. Excess powder is removed by lifting the reinforcement layer, turning it onto its edge and shaking it several times.

A more preferred method of applying the resinous powder is to spread it over the surface of the substrate by means of a flour sifter-type device. This device more uniformly distributes the resinous powder over the surface than by the hand method.

The most preferred method for distributing the resinous powder onto the reinforcement layer is by means of corona electrostatic powder spraying. This method is illustrated and described in a technical reference brochure entitled "Epoxy Resins and Curing Agents for Powder Coatings", Form No. 296-367-988 available from The Dow Chemical Company which is incorporated herein by reference. Excepts from this technical reference brochure states that the resinous powder is stored in a reservoir with caking being prevented by slow stirring with an agitator. Air fluidization of the bed is also sometimes used as an alternative to mechanical stirring. The resinous powder is conveyed to the electrostatic spray head by air motion. Often, the spray head is fastened onto a gun-like holder for convenience of operation. An orifice is fitted onto the spray head. Before the powder leaves the orifice, it is electrostatically charged by internal electrodes connected to a high-tension generator. The reinforcement layer to be sprayed with resinous powder (hereafter called the target) is attached to an electrically grounded holder. The resinous powder is projected towards the target by the flow of air. The target is electrically grounded so that the resinous powder will adhere during subsequent operations where the thus sprayed sheets must be handled. The thickness of the powder layer laid down by the electrostatic spraying technique is primarily a function of the total charge of resinous powder deposited on the target. The total charge deposited is a function of the voltage applied by the high-tension generator, and reaches a maximum at some intermediate value of applied voltage.

This is the most preferred method because it is easy to duplicate from reinforcement layer to reinforcement layer, both in the amount of powder applied and in the extent of coverage of the powder.

The following examples are illustrative of the present invention and are not to be construed as to limiting the scope thereof in any manner.

Resin A is a diglycidyl ether of bisphenol A having a melting point of 55-60 degrees° C. an epoxide equivalent weight of 675-750, available from the Dow Chemical Company as TACTIX ™ 226 epoxy resin.

Resin B is a diglycidyl ether of bisphenol A having a viscosity of 4400 cps to 5600 cps (4.4 to 5.6 Pa.s) at 25° C., an epoxide equivalent weight of 172 to 176 and is commercially available from The Dow Chemical Company as TACTIX ™ 123 epoxy resin.

Hardener A is a cycloaliphatic diamine having a viscosity of 8 to 12 cps (0.008 to 0.12Pa.s) at 25° C., an amine equivalent weight of 28 to 29 and is commercially available from The Dow Chemical Company as TACTIX ™ H31.

EXAMPLE 1

Preparation of Powdered Resin

Resin A is ground to a fine powder using a Bantam Mill, fitted with a 0.013 inch herringbone grill insert. The apparatus is cooled with liquid nitrogen, whose liquid feed rate is adjusted to keep the grinding chamber between 65° F. (18.3° C.) and 75° F. (23.9° C.).

In a typical run, the grinding mill is slowly fed with resin A, in flake form (1/16 inch to ⅛ inch: 1.5875 mm × 3.175 mm). Resin A in powder form, is removed from the accumulator and stored in plastic bags, at a temperature of 80° F. (26.7° C.) or less.

A typical analysis of this material is shown in Table I. This analysis is obtained by sifting the ground material through a set of standard sieves, using a Model L3P sonic sifter (ATM Corporation). The sonic sifter is charged with 2-3 grams of sample. The amplitude control is adjusted so that the particles are observed to "roll" around the surface of the uppermost standard sieve.

TABLE I

| Typical Analyses | |
| --- | --- |
| Sieve Opening microns | Amount of Material Weight % |
| 180 | 1.6 |
| 140 | 3.0 |
| 105 | 10.6 |
| 63 | 60.7 |
| 53 | 11.6 |
| 44 | 6.2 |
| fines | 6.3 |
| Total | 100 |

EXAMPLE 2

Deposition of the Resinous Powder on the Reinforcement Layer—Electrostatic Method Resin A is electrostatically sprayed onto a graphite fabric using a Nordson spray unit, consisting of a NPE-2M spraygun, a NPE-CC8 power supply, an HRS-H4 hopper, and a 100 psig (6894.8 kPa) air pump. The graphite fabric is woven in a 8HS weave pattern, using 3K tows.

There are three adjustments in a typical Nordson unit that affect air flow; flow pressure, atomization pressure, and fluidization pressure. These are initially set at 30 psi (206.8 kPa), 20 psi (137.9 kPa) and 2 to 3 psi (13.8 to 20.7 kPa), respectively. In addition, the amount of static charge imposed on the resinous powder is set at 75 kilovolts.

In a typical run, the hopper is filled with resinous powder A, such that it is at least half-full. Caution must be observed so that the operating level does not fall too low, i.e below about 10 percent of the hopper height. If this occurs, there exists the possibility that an uneven coating of powder will be deposited on the surface of the reinforcement layer. The fluidization pressure is adjusted to give a constant powder flow.

The reinforcement layer to be coated is suspended vertically from electrically grounded clips, and the spray gun pointed toward it. The air supply pressure to the nozzle is adjusted so that the flow of air through the nozzle increases. The orifice in the spray gun is adjusted so that the desired spray pattern is obtained. The atomization pressure is also adjusted to help give the desired spray pattern.

As soon as the powder begins to emanate from the nozzle of the gun, the nozzle is directed over the reinforcement layer in a sweeping up and down pattern. Alternatively, the nozzle can be directed in a sweeping back and forth pattern. This is continued until the surface of one side has been fully covered.

The resinous powder is melted onto the surface of the reinforcement layer using an oven set at 180° F. (82.2° C.) to 200° F. (93.3° C.). The reinforcement layer is placed in the oven for approximately five minutes. The powder melted readily into the surface of the woven fabric. Caution must be observed such that the resinous powder does not melt too quickly and run into the interstices of the woven fabric. This can be prevented by not setting the temperature of the oven more than 40 degrees F above the melting point of the resinous powder.

Table II shows the results of spraying the graphite panel. Only one side of the panel is sprayed. The weight percentages shown are the arithmetic averages of the results of 10 panels.

TABLE II

Typical Weight Percent of Powdered Resin Deposition on 8 HS Graphite Fabric

| Pattern | Weight % |
|---|---|
| Single Pass, up and down | 2.5 |
| Single Pass, back and forth | 2.7 |
| Double Pass, up and down & back and forth | 5.1 |

EXAMPLE 3

Deposition of Resinous Powder on a Glass Reinforcement Layer by the Electrostatic Method Resin A is electrostatically sprayed onto a glass fabric using substantially the same equipment described in experiment 2. Identical adjustments are made in flow pressure, atomization pressure, and fluidization pressure in this experiment as are made in experiment 2. The glass fabric is woven in a 8HS pattern, and is identified as 181 style fabric.

During deposition of the powder, substantially the same procedure as in Example 2 is employed. Several passes are made with the spray gun, using similar spray patterns as previously described in Example 2.

The main difference noted is in the procedure used to melt the powder into the interstices of the woven fabric. Because of the substantial differences in density and heat capacity between glass and graphite, adjustments had to be made in both the temperature of the oven, and in the residence time in the oven. It is found that a somewhat higher temperature, applied for a longer period of time, is needed to melt the resinous powder onto the glass. For 181 glass fabric, an oven temperature of 200° F. (93.3° C.) to 220° F. (104.4° C.), applied for at least 10 minutes, is required to melt the powder.

The results are shown in Table III. Again, the percentages are arithmetic averages of a least 10 panels. Less material per pass, on a weight percent basis, is deposited on the glass panel due to the increased density of the glass fibers.

TABLE III

Typical Weight Percent Deposition of Powdered Resin on 181 Glass Fabric

| Pattern | Weight % |
|---|---|
| Single Pass, up and down | 2.0 |
| Single Pass, back and forth | 2.2 |
| Double Pass, up and down & back and forth | 4.1 |

EXAMPLE 4

Fabrication of Preforms From Treated Reinforcement Layers

The fabric produced in experiments 2 or 3 is used in fabricating preforms. Several techniques are tried.

Multilayered preforms are built up by stacking individual plys of treated reinforcement layers together and tacking them to one another by application of a hot iron. The iron is maintained at a temperature of 65° C. to 85° C. The iron is applied for only a short length of time, usually 20 to 40 seconds.

Three dimensional preforms are fabricated by forming the treated reinforcement layers around forms. These are then tackwelded together by the application of a hot iron at the seams where the material overlapped.

Finally, multilayer, three dimensional preforms are produced by thermoforming the treated reinforcement layers in heated molds. After the molds are cooled to ambient temperature, the finished preform is removed from the mold.

EXAMPLE 5

Fabrication of Graphite Composites using a Multilayer Preform

The object of this experiment is to show that the mechanical properties of a composite panel are not affected by the treatment of the individual plys of the panel with the thermoplastic-like resinous material.

The procedure used to fabricate the composite panel is called resin transfer molding (RTM). In RTM, a thermoset resin system is injected into a mold containing a fibrous preform. The resin system displaces the air in the fibrous preform as it is pumped into the mold. As the resin exits the mold, it is foamy with air at first. As the air is swept out of the mold, the resin stream exiting the mold slowly becomes clear.

The multilayer preform used consists of eight plys of 8HS-3K Hercules graphite fabric, treated with a thermoplastic-like resinous material. The individual plys of treated graphite reinforcement material are tacked together using a hot iron. The preform is put inside a steel mold having a female cavity of internal dimensions 0.125 inch by 15 inches by 20 inches (3.175 mm ×381 mm×508 mm). The mold is then closed and 300 psig (2,068.4 kPa) of back-pressure is applied.

A mixture of Resin B and Hardener A are injected into the mold cavity under pressure (50 to 150 psig: 344.7 to 1,034.2 kPa) at 130° F. After all of the air has been flushed out of the reinforcement, the mold entrance and exit ports are sealed under a back pressure of 50 psig (344.7 kPa).

The mold is then subjected to a cure schedule of one hour at 225° F. (107.2° C.), and two hours at 350° F. (176.7° C.). The mold is then cooled to 100° F. (37.8° C.) and the panel removed.

The mechanical properties of the finished panel are determined at room temperature. Table IV shows these properties The panel has a fiber volume of 54%.

TABLE IV

Composite Mechanical Properties Graphite Substrate

| Properties | Treated[1] | Control*[2] |
|---|---|---|
| Tensile | | |
| Strength, psi | 107,000 | 104,500 |
| Strength, kPa | 737,744 | 720,507 |
| Tensile | | |
| Modulus, psi | 10 × 10$^6$ | 10 × 10$^6$ |
| Modulus, MPa | 68,948 | 68,948 |
| Elongation, % | 1.1 | 1.0 |
| Compression | | |
| Strength, psi | 91,000 | 92,100 |
| Strength, kPa | 627,427 | 635,012 |
| Short Beam | | |
| Shear Strength, psi | 7,900 | 8,200 |
| Shear Strength, kPa | 54,469 | 56,537 |

*Not an example of the present invention.
[1]Substrate is treated with 4.0 wt. % Resinous powder A from example 2.
[2]Substrate is untreated fabric.

EXAMPLE 6

Fabrication of a Glass Composite using a Multilayer Preform

The procedure of Example 5 is repeated except that 12 plys of 181 glass fabric is used instead of graphite. THe injection pressure varies from 25 psig to 75 psig (172.4 kPa to 517.1 kPa) due to the lower fiber volume. All of the other physical variables are essentially unchanged from Example 5. The panel contains 58% glass fibers by weight. The mechanical properties of the finished panel are determined at room temperature. They are shown in Table V.

TABLE V

Composite Mechanical Properties Glass Substrate

| Properties | Treated[1] | Control*[2] |
|---|---|---|
| Tensile | | |
| Strength, psi | 81,300 | 82,600 |
| Strength, kPa | 560,547 | 569,510 |
| Tensile | | |
| Modulus, psi | 4 × 10$^6$ | 3.9 × 10$^6$ |
| Modulus, MPa | 27,579 | 26,890 |
| Elongation, % | 2.5 | 2.5 |
| Compression | | |
| Strength, psi | 75,200 | 76,500 |
| Strength, kPa | 518,489 | 527,452 |
| Short Beam | | |
| Shear Strength, psi | 9,500 | 9,400 |
| Shear Strength, kPa | 65,501 | 64,811 |

*Not an example of the present invention.
[1]Substrate is treated with 4.5% wt. resinous powder A from example 3.
[2]Substrate is untreated fabric.

What is claimed is:

1. A method for preparing preforms which comprises (1) applying substantially evenly onto the surface of each of one or more plys of an unimpregnated substrate material one or more non-sintering thermoplastic-like resinous compounds which are substantially free of any compound which would serve as a crosslinker for said thermoplastic-like, solid resinous compound, said resinous compound being in the form of a powder having a particle size of less than about 500 microns and having a melting point of from about 50° C. to about 70° C. in an amount of from about 2 to about 12 percent by weight based upon the weight of said substrate material; (2) fusing said powdered thermoplastic-like resinous compound into a film on the surface of said substrate material: (3) cooling said resinous material: (4) assembling one or more plies of the thus treated substrate material and conforming said plies of said treated substrate material into a desired shape: (5) subjecting the thus shaped plies of treated substrate material at a temperature sufficient to melt said resinous compound; and (6) cooling said shaped treated plies of substrate material to a temperature below the melting point of said resinous compound; thereby forming a preshaped preform for use in molding processes as reinforcing material.

2. The method of claim 1 wherein said non-sintering, thermoplastic-like resinous compounds have a particle size in the range of from about 20 to about 500 microns; a melting point of from about 55° C. to about 65° C.; and is employed in an amount of from about 3 to about 8 percent by weight based upon the weight of said substrate material.

3. The method of claim 1 wherein said non-sintering, thermoplastic-like resinous compounds have a particle size in the range of from about 30 to about 200 microns; a melting point of from about 57° C. to about 60° C.: and is employed in an amount of from about 4 to about 6 percent by weight based upon the weight of said substrate material.

4. The method of claim 3 wherein said non-sintering, thermoplastic-like resinous compounds have a particle size in the range of from about 40 to about 80 microns.

5. The method of any one of claims 1, 2, 3 or 4 wherein said non-sintering, solid, thermoplastic-like resinous compound is an epoxy resin, unsaturated polyester resin or vinyl ester resin, or any combination thereof; said substrate material is glass, graphite or carbon, or any combination thereof: and said substrate material is in the form of woven or non-woven fibrous material, random fibers, monofilaments, multi-strands of monofilaments or any combination thereof.

6. The method of claim 5 wherein said non-sintering, solid, thermoplastic-like resinous compound is a di- or polyglycidyl ether of biphenol, bisphenol, hydrocarbyl substituted biphenol, hydrocarbyl substituted bisphenol, phenol or hydrocarbyl substituted bisphenol-aldehyde novolac resin, unsaturated hydrocarbon-phenol or hydrocarbyl substituted phenol resin, or any combination thereof; said substrate material is glass, graphite or carbon, or any combination thereof; and said substrate material is in the form of woven fibrous material.

7. The method of claim 6 wherein said non-sintering, solid, thermoplastic-like resinous compound is a diglycidyl ether of bisphenol A, bisphenol F or bisphenol K, or any combination thereof.

* * * * *